UNITED STATES PATENT OFFICE.

JEGOR ISRAEL BRONN, OF ROMBACH, GERMANY, ASSIGNOR OF ONE-HALF TO THE FIRM OF ROMBACHER HUTTENWERKE, OF ROMBACH, GERMANY.

PROCESS OF MANUFACTURING IRON AND STEEL.

1,233,970.  Specification of Letters Patent.  Patented July 17, 1917.

No Drawing.  Application filed April 24, 1917.  Serial No. 164,274.

*To all whom it may concern:*

Be it known that I, JEGOR ISRAEL BRONN, a citizen of Empire of Germany, residing at Rombach, in Lothringen, Germany, have invented certain new and useful Improvements in Processes for Manufacturing Iron and Steel, of which the following is a specification.

In the manufacture of iron and steel according to the so called Bessemer, Thomas and Martin processes iron baths are obtained which at the end of the refining process contain a considerable amount of oxygen partly in the form of iron oxygen combinations such as protoxid of iron which must be subjected to some deoxidation process before the metal can be used for industrial purposes.

The object of this invention is to effectively and cheaply produce deoxidation of oxygen containing iron baths. To this end the oxygen containing iron baths obtained in one of the said known processes for manufacturing iron and steel are treated according to the invention with phosphorus containing iron such as phosphorus pig iron, used as raw material in the so called Thomas process. When the phosphorus pig iron used is just sufficient to react with the oxygen of the bath and produce the deoxidation, no substantial impurification of the bath results. Under certain conditions it may be advisable to calculate the quantity of the phosphorus containing iron for treating the oxygen containing bath in such a manner that its amount somewhat exceeds the quantity which is necessary for deoxidation of the bath so that a very small amount of phosphorus enters the iron bath. Such a small amount of phosphorus in the bath, then practically free of oxygen, can easily be removed again by a refining process of short duration without appreciably deteriorating the bath, as far as the oxygen contents is concerned. This new deoxidation method avoids broadly the necessity of using ferro-manganese or other expensive deoxidizing agents. Of course the addition of such a substance as ferro-manganese is not excluded by the use of this invention and it may be added when it is desirable to obtain an iron and steel product containing a definite amount of manganese.

When this invention is used in connection with the manufacture of iron and steel according to the so called Thomas process within the converter then I prefer to proceed as follows: The converter is fed in the usual manner with phosphorus pig iron and blown as usual in order to refine the metal till the phosphorus of the bath is substantially removed and the bath enriched with oxygen. Hereafter the supernatant layer of slag is removed and then an addition of molten phosphorus containing pig iron for instance, Thomas pig iron of the same quality as that with which the converter is fed, is made, a quantity of about 500 kg. of Thomas pig iron being under ordinary conditions sufficient for a converter containing about 22 tons molten iron. This addition of pig iron is allowed to react with the molten bath and the bath then poured into ingot molds as usual. If it is intended to raise the contents of the finished metal in manganese then a suitable quantity of ferro-manganese or other suitable manganese containing iron may be mixed with the liquid iron of the converter either within the converter itself or within the ingot mold.

The deoxidizing effect of the addition of Thomas pig iron to the converter charge appears from the following comparative data relating to working with Thomas pig iron containing 0.45% silicon, 1.20% manganese, 1.85% phosphorus and 3.5% carbon:

| | Mn | P | C |
|---|---|---|---|
| Iron bath within the converter before addition of pig iron | 0.19% | 0.045% | 0.05% |
| Iron bath after addition of Thomas pig iron | 0.25% | 0.085% | 0.07% |

It is advisable to add the phosphorus containing pig iron to the converter bath in liquid condition in order to improve the intermixing and the reaction of the phosphorus of the pig iron addition with the oxygen of the bath.

The molten Thomas pig iron to be added to the converter bath may be taken from a pig iron mixer. However, I prefer to take it from a suitable smaller receptacle provided with some heating device and fed with Thomas pig iron from the iron mixer.

A modification of this process consists therein that the molten Thomas pig iron used for deoxidation is introduced into the ingot mold so that intermixing between this deoxidizing agent and with the metal of the bath takes place on pouring the bath into the ingot mold.

Another modification of the process of deoxidizing a converter bath according to the invention consists therein that a quantity of molten Thomas pig iron exceeding that amount required for deoxidizing the bath is added to the converter bath preferably after removing the layer of slag from same, and that thereafter the blowing operation is continued for some seconds say for instance 8 seconds in order to again remove the phosphorus from the bath up to the desired degree of refining.

In this case for instance 1200 kg. of Thomas pig raw iron may be added to a converter charge of 20 tons.

The effect of the process according to this embodiment appears from the following comparative data:

| | | |
|---|---|---|
| Converter bath (20 tons) after blowing | 0.17% Mn 0.025% P | 0.05% C |
| Converter bath after addition of Thomas pig iron (1200 kg) | 0.28% Mn 0.080% P | 0.19% C |
| Converter bath after renewal of blowing (8 seconds) | 0.06 % P | 0.04% C |

It is remarkable that the bath after addition of the 1200 kg. of Thomas pig iron contained more manganese than the sum of that contained in the bath after blowing and that in the 1200 kg. of added pig iron.

This appears from the following calculation: The 20 tons pig iron contained after blowing 0.17% or 34 kg. manganese, the 1200 kg. added pig iron containing 1.20% manganese=14.4 kg. manganese, therefore the bath and the added pig iron contain together 48.4 kg. manganese. The analysis of the bath, however, showed as stated 0.28% manganese. This makes on 21 200 kg. 59.4 kg. manganese. The protoxid of manganese therefore has been partly reintroduced into the bath as metallic manganese.

In connection with the open hearth furnace process the bath is refined as usual and the iron rich in phosphorus for instance, Thomas pig iron or ferro-phosphorus, added preferably in molten condition when the furnace charge is nearly finished. Care is to be taken that the slag layer on the iron bath is not very high in phosphorus and that it is in as thin liquid condition as possible.

The following comparative data show the effect of the addition of Thomas pig iron:

| | | |
|---|---|---|
| The furnace charge (35 tons) after refining contained | 0.26% Mn 0.030% P | 0.10% C |
| The Thomas pig iron addition (1500 kg.) contained | 1.75% Mn 2.78 % P | 3.5 % C |
| The deoxidized bath contained | 0.43% Mn 0.062% P | 0.15% C |

Again the bath shows an increase in manganese over the amount of manganese contained in the pig iron addition, namely:

| | | |
|---|---|---|
| The bath contained | 330 × 0.26 | 85.8 kg. |
| And the addition | 15 × 1.75 | 26.1 kg. |
| This makes together | | 111.9 kg. |

whereas the bath contained as above stated 0.43% manganese or 148 kg., so that an increase of 36.1 kg. manganese has taken place.

The phosphorus on the contrary shows a considerable decrease, namely:

| | | |
|---|---|---|
| The charge contained | 330 × 0.03 = | 9.9 kg. |
| The addition | 15 × 2.78 = | 41.8 kg. |
| This makes together | | 51.7 kg., | whereas the bath contained 345×0.062=21.3
kg., so that a decrease in phosphorus of 30.4 kg. has taken place which have been used for deoxidizing purposes.

These data relate to the pig iron ore process. Similar results are obtained in connection with the pig iron scrap process. If compared with the usual deoxidation process with ferro-manganese alone the deoxidation with pig iron (Thomas pig iron) rich in phosphorus results in saving 2 kg. metallic manganese or 4 kg. ferro-manganese with 50% of manganese for each ton of steel.

If desired the small quantities of manganese which it is eventually intended to incorporate in the iron bath can be incorporated in the deoxidizing pig iron so that a Thomas pig iron rich in manganese is obtained or from ferro-phosphorus a ferro-phosphorus material rich in manganese. In this way the additions of phosphorus and manganese would be combined to one single additional material.

What I claim is:

1. Process for manufacturing iron and steel consisting in preparing an iron bath of impure iron, refining the same by oxidation of the impurities and treating the bath oxygenated during the refining process with a phosphorus containing iron material to deoxidize the same.
2. Process for manufacturing iron and steel consisting in preparing an iron bath of impure iron, refining the same by oxidation of the impurities and deoxidizing the metal of the bath oxygenated during the refining process with a quantity of phosphorus containing iron material which is small in comparison with the quantity of the metal of the bath.

3. Process for manufacturing iron and steel consisting in preparing an iron bath of impure iron, refining the same by oxidation of the impurities, continuing the refining process till the bath is oxygenated, removing slag from the bath present during the refining process and deoxidizing the bath with iron material rich in phosphorus in a quantity which is small in comparison with the quantity of the metal of the bath.

4. Process for manufacturing iron and steel consisting in preparing an iron bath of impure iron, refining the same by oxidation of the impurities, continuing the refining process till the bath is oxygenated and deoxidizing the bath with iron material rich in phosphorus in a quantity which is small in comparison with the quantity of the metal of the bath, however exceeding the quantity necessary to effect deoxidation of the bath by reaction of the phosphorus with the oxygen of the bath and taking up the refining operation for a short period.

5. In a process for manufacturing iron and steel the step of deoxidizing oxygen containing iron baths with iron material rich in phosphorus.

6. Process for manufacturing iron and steel consisting in preparing a phosphorus pig iron containing iron bath, refining the same so as to oxidize the impurities therein, continuing such refining process till the phosphorus of the bath is substantially removed and the iron bath oxygenated and then treating the molten iron with a comparatively small proportion of phosphorus containing iron sufficient to deoxidize the bath.

7. Process for manufacturing iron and steel consisting in preparing a phosphorus pig iron containing iron bath, refining the same so as to oxidize the impurities therein, continuing such refining process till the phosphorus of the bath is substantially removed and the iron bath oxygenated and then treating the molten iron with a comparatively small proportion of a so called Thomas pig iron material containing besides phosphorus manganese the quantity of such material being so calculated that it is sufficient to deoxidize the bath.

8. Process for manufacturing iron and steel consisting in preparing a phosphorus pig iron containing bath within a converter, subjecting the same to blowing in order to oxidize the impurities therein, continuing the blowing operation till the phosphorus of the bath is substantially removed and the bath oxygenated, removing the slag from the bath adding a comparatively small proportion of phosphorus containing molten Thomas pig iron exceeding somewhat the quantity which is necessary for deoxidation of the bath and renewing the blowing operation for a few seconds to oxidize the small phosphorus-content again present within the bath.

9. Process for manufacturing iron and steel consisting in preparing an iron bath of impure iron, refining the same by oxidation of the impurities and treating the bath oxygenated during the refining period, as it is poured, with a phosphorus containing iron material to deoxidize the same.

In testimony whereof I affix my signature in presence of two witnesses.

JEGOR ISRAEL BRONN.

Witnesses:
   IDA ALTMANN BRONN,
   W. S. SPERGELBERG.